United States Patent
Croot et al.

(10) Patent No.: US 8,537,701 B2
(45) Date of Patent: Sep. 17, 2013

(54) MONITORING DATA COMMUNICATIONS IN AN ACCESS NETWORK

(75) Inventors: Christopher M Croot, Bury St Edmunds (GB); Trevor P Linney, Stowmarket (GB); John W Cook, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 494 days.

(21) Appl. No.: 12/809,798

(22) PCT Filed: Dec. 19, 2008

(86) PCT No.: PCT/GB2008/004213
§ 371 (c)(1),
(2), (4) Date: Jun. 21, 2010

(87) PCT Pub. No.: WO2009/081131
PCT Pub. Date: Jul. 2, 2009

(65) Prior Publication Data
US 2010/0290362 A1    Nov. 18, 2010

(30) Foreign Application Priority Data

Dec. 21, 2007 (EP) .................................. 07255001

(51) Int. Cl.
H04L 12/26 (2006.01)
H04L 12/28 (2006.01)
H04L 12/56 (2006.01)

(52) U.S. Cl.
USPC ............................ 370/252; 370/401; 370/420

(58) Field of Classification Search
None
See application file for complete search history.

(56) References Cited

U.S. PATENT DOCUMENTS 6,546,089 B1 * 4/2003 Chea et al. ................. 379/93.06
6,782,884 B1   8/2004 Chen et al.
(Continued)

FOREIGN PATENT DOCUMENTS

WO    02/12497    2/2002
WO    02/35793    5/2002
(Continued)

OTHER PUBLICATIONS

T. Bostoen et al., "Optimizing DSL for multimedia services", Alcatel Telecommunications Review, p. 155-159, Jun. 13, 2005.*

(Continued)

*Primary Examiner* — Faruk Hamza
*Assistant Examiner* — Cassandra Decker
(74) *Attorney, Agent, or Firm* — Nixon & Vanderhye P.C.

(57) ABSTRACT

A management device for use in an access network including a plurality of data connections between end user devices and an aggregation transceiver device where the connections are aggregated for onward connection through the access network, the access network storing in association with each data connection a Dynamic Line Management, DLM, profile which specifies a set of values for a plurality of parameters associated with the respective data connection, together with a stability level specifying a desired level of stability for the data connection. The device comprises means for receiving monitoring data specifying the stability of each respective data connection over a predetermined period of time; means for selecting a DLM profile to be applied to the connection in dependence on both the monitoring data and the stored stability level associated with the data connection; and means for requesting an OSS system of the access network to apply the selected profile to the data connection.

11 Claims, 3 Drawing Sheets

(56) References Cited

U.S. PATENT DOCUMENTS

| | | |
|---|---|---|
| 7,076,556 B1 | 7/2006 | Brock et al. |
| 7,130,870 B1 | 10/2006 | Pecina et al. |
| 2002/0136203 A1 | 9/2002 | Liva et al. |
| 2003/0182666 A1 | 9/2003 | You |
| 2005/0237940 A1* | 10/2005 | Tennyson .................. 370/235 |
| 2006/0072722 A1 | 4/2006 | Savoor et al. |

FOREIGN PATENT DOCUMENTS

| | | |
|---|---|---|
| WO | 2005/057315 | 6/2005 |
| WO | 2006/103557 | 10/2006 |

OTHER PUBLICATIONS

European Search Report dated Jul. 7, 2008 issued in European Application No. 07255001.5.

International Search Report for PCT/GB2008/004213, mailed May 13, 2009.

Verlinden, Jan et al., "Dynamic Spectrum Management for Digital Subscriber Lines" Edition 2, White Paper: Alcatel 2005 (12 pgs.).

Silverman et al., "(G.gen: G.vdsl: G.ploam:—New Reporting and Control to Improve the Carriers Ability to Optimize VDSL2", ITU—Telecommunication Standardization Section, Temporary Document SD-075, ASSIA Inc., San Diego, CA Jan. 15-19, 2007 (8 pgs).

* cited by examiner

MONITORING DATA COMMUNICATIONS IN AN ACCESS NETWORK

This application is the U.S. national phase of International Application No. PCT/GB2008/004213 filed 19 Dec. 2008, which designated the U.S. and claims priority to European Application No. 07255001.5, filed 21 Dec. 2007, the entire contents of each of which are hereby incorporated by reference.

FIELD OF THE INVENTION

The present invention relates to data communication. In particular, it relates to the management of an access network including Digital Subscriber Line (DSL) connections.

BACKGROUND TO THE INVENTION

Dynamic Line Management (DLM) is a technique for improving the stability of DSL connections. It is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs to be re-established. This is referred to as a re-synch or a re-train and the user notices a temporary loss of service while the connection is re-established. Re-synchs are generally found to be particularly annoying by end users.

DLM seeks to minimise such re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different profiles having various different sets of values for the parameters most likely to have an impact on the stability or otherwise of a DSL connection and moving a particular connection between different profiles until a profile is found which has an acceptable stability. The profiles are applied at the local exchange (sometimes referred to—especially in the USA—as the central office) usually within a piece of equipment known as a Digital Subscriber Line Access Multiplexer (DSLAM) which houses a number of DSL transceiver units as is well known in the art.

Typically, the profiles are conceptually able to be thought of as ranging between more aggressive and less aggressive, where the more aggressive profiles tend to provide better services to the user (in terms of especially higher bit rates and lower latencies) but are more likely to result in the line being unstable, whereas less aggressive profiles tend to offer lower bit rates and/or latencies but greater stabilities.

An Alcatel Technology White Paper entitled "Dynamic Line Management for Digital Subscriber Lines" and available at the following URL http://www1.alcatel-lucent.com/com/en/appcontent/apl/18812_DLM_twp_tcm172-228691635.pdf discusses DLM and suggests in overview an implementation in which there is a Validation Phase and an Operations phase. In the validation phase a connection is monitored fairly intensively to identify an appropriate profile for the line and thereafter it is monitored less intensively to ensure that the originally selected profile continues to remain valid.

Co-pending European patent application No. 07250428.5 describes an earlier DLM solution devised by the present applicants in which very unstable data connections are detected in an efficient manner and corrective action is taken within a relatively short period of time whilst data connections which are not very unstable are monitored and transitioned between different profiles based on more thorough monitoring over a longer time-scale.

All of the DLM solutions known to the present applicant use, as at least one of the metrics used in monitoring the performance of a line, the number of re-trains or re-synchs occurring on a line within a predetermined period of time. However, the present inventors have realised that this metric can in certain circumstances be misleading and it should therefore be processed to provide a more reliable metric of line performance.

SUMMARY OF THE INVENTION

According to a first aspect of the invention, there is provided a method of operating an access network including a plurality of data connections between end user devices and an aggregation transceiver device where the connections are aggregated for onward connection through the access network, the method comprising: storing a plurality of different profiles, each of which specifies a set of values for a plurality of parameters associated with each data connection, and, for each data connection, monitoring the performance of the connection; selecting one of said stored profiles to be applied to the connection in dependence on the results of monitoring the connection; and applying the selected profile to the data connection, wherein monitoring the connection includes determining or estimating number of times that the connection resynchronises, within a given period of time, as a result of an automatic or forced resynchronisation and using the determined or estimated number of forced resynchronisations when selecting a profile to apply to the data connection.

In accordance with the above set out first aspect, the metric of the number of resynchs per unit time is modified to remove (generally speaking, at least some of) the resynchs caused by user action rather than as a result of the line experiencing technical problems or instability, etc, thus providing a more useful metric for use in performing Dynamic Line Management.

An automatic or forced re-synchronisation is one which occurs because errors on the connection cause a complete loss of connection. When this occurs, the end modems revert to an initial state in which a connection is re-established from scratch, rather than trying to rescue the previous connection. This is set out in the various xDSL standards including, in particular, ITU-T G992.1-ADSL1, ITU-T G992.3-ADSL2, ITU-T G992.5-ADSL2+ and ITU-T G994.1-Handshake Procedures for digital subscriber line (DSL) transceivers.

Preferably, determining or estimating the number of forced resynchronisations comprises determining the total number of resynchronisations (in the given period of time of interest) for all reasons, estimating the total number of those resynchronisations caused by a user and subtracting this estimated number of user caused resynchronisations to obtain an estimate for the number of forced resynchronisations.

Preferably, the step of estimating the number of user caused resynchronisations comprises detecting that more than a predetermined minimum period of time prior to or after a resynchronisation has elapsed without a connection having been established and without the line automatically attempting, but failing, to re-establish the connection. Thus if the user simply switches off or unplugs the modem for a period of time greater than the minimum period of time, the resulting re-synchronisation is determined to be a user caused re-synchronisation rather than a forced resynchronisation. Preferably this is achieved by counting the contiguous periods of downtime exceeding the predetermined minimum period within the (longer) given period.

In one embodiment, a record is kept of each 15 minute period (bin) during which there is no connection in place, and the number of sets of contiguous periods in which no connection is recorded as being in place within any 24 hour period (batch) is taken as the estimated number of user caused resynchronisations within that 24 hour period; naturally, in alternative embodiments, different periods of time may be used for the bins or for the batches (e.g. 5 minute period bins and 48 hour batches, etc.). The number of contiguous periods (bins) may conveniently be determined by counting the number of transitions between periods (bins) in which no connections is recorded as being present and periods (bins) in which a connection is recorded as being present.

According to a second aspect of the invention, there is provided a method of operating an access network including a plurality of data connections between end user devices and an aggregation transceiver device where the connections are aggregated for onward connection through the access network, the method comprising: storing a plurality of different profiles, each of which specifies a set of values for a plurality of parameters associated with each data connection, and further storing, in respect of each of the connections, a stability level and performing the following steps: for each data connection, monitoring the performance of the connection; selecting one of said stored profiles to be applied to the connection in dependence on both the results of monitoring the connection and the stability level associated with the data connection; and applying the selected profile to the data connection.

Thus the method of the second aspect permits different stability policies (each of which corresponds to or specifies a stability level) to be applied to different data connections to reflect the different possible uses for the connection which may place different values on the relative merits of line stability, bandwidth and latency. The different stability policies preferably control the circumstances under which a connection will be transitioned between different profiles (for example by tolerating a greater number of errors or re-synchronisations per unit time before transitioning to a less aggressive profile and vice versa).

Preferably two main parameters which control the operation of xDSL connections are varied to generate different profiles, the Signal-to-Noise Ratio (SNR) margin and the fast/interleave mode.

The SNR margin represents the amount of redundancy built into the selected bit rate (and other connection options) for the connection, given the measured value of the actual SNR experienced by the modem. Thus, each possible set of significant values for the connection parameters (i.e. bit-rate, level of trellis coding, level of interleave, etc.) has a corresponding baseline SNR which represents the minimum value of the SNR at which the connection would be expected to operate with a Bit Error Rate (BER) of $10^{-7}$ (i.e. 1 bit is expected to be in error for every $10^7$ bits); this BER of $10^{-7}$ is called the target rate as the connection is expected to operate very well with this level of BER. The SNR margin represents the amount (in decibels) by which the actual measured SNR exceeds this baseline amount at the time of setting up the connection. Thus the actual received SNR may vary over time, after setting up the connection, below the measured amount at setting up the connection by up to the amount of the margin and still the connection would be expected to operate with a BER of less than or equal to the target amount (i.e. at least as good as the target amount).

The definition of SNR margin which is given in the xDSL standard ITU G992.1 Section 9.5.1 is "Signal-to-Noise Ratio (SNR) margin: The signal-to-noise ratio, margin represents the amount of increased received noise (in dB) relative to the noise power that the system is designed to tolerate and still meet the target BER of $10^{-7}$, accounting for all coding (e.g. trellis coding, RS FEC) gains included in the design. The SNR margin ranges from −64.0 dB to +63.5 dB with 0.5 dB steps."

It will thus be appreciated, that the lower the SNR Margin, the higher the headline bit rate that will be achievable (i.e. assuming that there are no errors). Whilst, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this may change in the future. As is well known in the art, use of interleave protects against short duration noise spikes by interleaving units (e.g. bytes) of a certain number (depending on the depth of interleave) of code words (each comprising several units) where each code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to both be recovered if a noise caused two adjacent units within a two word transmission period to become corrupted). Interleaving provides protection against impulsive noises at the expense of increased latency (and greater buffering requirements of network equipment).

The functionality (or sub-components of this functionality) of the present invention may be performed by a number of different devices. In particular, the stability level may be stored within the aggregation transceiver device (e.g. the DSLAM) or a device associated therewith. This would correspond to an embodiment in which the access network controller/operator takes responsibility for implementing different stability policies for different data connections. This is particularly advantageous where this is the party which has control for switching between different connection profiles (as is generally the case) and for cases where the connection does not wish to transition between different stability policies on a very frequent basis (e.g. depending on the particular application being used by the user device at any particular time) since this could cause difficulties for a centralised system which has to deal quickly with what could potentially be very many customers.

In an alternative embodiment, however, the stability policies may be stored at the respective end user device. Based on the selected stability policy (and with suitable knowledge of the level of stability which the DSLAM is attempting to provide for that data connection) the user device may include some functionality (e.g. provided by a suitable computer program) which intercepts messages from the DSL modem of the end user device destined for the network side DSL modem (e.g. located in the aggregation transceiver device) and modifies these messages such that the so as to cause the network side DSL modem to set up a DSL connection which is more or less aggressive (in terms of bandwidth or latency or both).

Equivalently, the normal operation of the DSL modem could simply be altered such that for different stability levels or policies the modem generates different messages to be returned to the network side DSL modem.

An example of a computer program which operates in this general manner and which could (preferably with some suitable modifications discussed below) be used for this purpose is the "DMT tool" which is available for download at http://dmt.mhilfe.de/. This program operates by sending information about characteristics of the connection (especially the SNR) which is not based purely on what has been detected by the modem according to the normal operation of the modem. Instead, with the DMT tool, this information may be input directly by a user of the tool, thus over-writing the information that would normally be sent by the modem. However, in a preferred embodiment of the present invention, this program would not be used to modify the SNR values (or would not be used only to modify the SNR values) reported by the end user modem to the network-side modem, but rather (or in addition) the number of errors (especially the number of errored seconds) occurring in the downstream direction which are dependent upon the actual measured characteristics as well as the stability level associated with the currently in force stability policy for the connection.

Preferably, in all cases, the different profiles are all stored at the network side (e.g. at the DSLAM) and the network operator has responsibility for selecting the actual profile applied to a connection, though this is usually done at least partially in response to messages coming from the end user's DSL modem. Preferably, the parameters used to determine whether or not a change of profile should be made include the number of times that a re-synch has occurred on a DSL connection within a certain period of time and the number of errored seconds which have occurred within a certain period of time (e.g. within the past 24 hours).

Preferably, the system additionally includes a stability policy selector which selects an appropriate stability policy based on the usage (or intended or requested usage) of the connection. Preferably the selector is user or operator configurable and it preferably acts as a state machine, whereby some circumstances may result in a new policy being adopted for some states of the selector but not for others. For example, the selector may have three states of aggressive, normal and stable and may be configured such that if the selector is in the stable state and the user switches from a video streaming application to web-browsing, the selector may change state from stable to normal, while if the selector is in the aggressive state and the user switches from a gaming application to web-browsing, the selector may not change state, etc. As with the storage of the stability level or policy, this selector could also be implemented either at the end user side of the DSL connection (corresponding to the embodiment where control of the stability policy lies with the end user device) or at the network/DSLAM side of the DSL connection (corresponding to the embodiment where the network operator has responsibility for the currently applied stability level or policy for the connection).

Preferably, the selector includes means for causing a re-synchronization of the DSL connection where it transitions from one state to another.

Preferably, the data connections are digital subscriber lines including remote and central transceiver units connected over a copper pair and operating in accordance with one or more of the various xDSL standards agreed by the International Telecommunication Union (ITU) (e.g. G.992.x and their annexes). Preferably the aggregation transceiver device is a Digital Subscriber Access Multiplexer (DSLAM).

Preferably the profiles are ranked according to a level of aggressiveness, where more aggressive profiles are, in general, more likely to result in a connection becoming unstable.

Further aspects of the present invention relate to systems, devices, computer programs and carrier means or media as set out in the accompanying claims, especially tangible carrier means such as optical storage devices (e.g. compact discs (CD's) or DVD's), or magnetic storage devices such as magnetic discs, or non-volatile solid-state memory devices.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

The main embodiment described below uses a management device 100 to perform two principal functions—Broadband Remote Access Server (BRAS) provisioning and Dynamic Line Management (DLM). The BRAS provisioning is described in brief in this application, for the sake of completeness, but it is described in greater detail in co-pending International patent applications GB2006/002826 and GB2006/002818 both filed on 28 Jul. 2006, referred to above, for readers interested in the particulars of the preferred methods of BRAS provisioning applicable to the main embodiment.

As for the DLM function, this is desirable in the main embodiment because the downstream speed of the ADSL connections controlled by the management device of the main embodiment rate adapts to the highest speed the line can support from 2 Mb to 8 Mb. As the ADSL connections are running at their maximum limits they are more susceptible to noise which can cause errors and spontaneous resynchronisations (resyncs).

In overview, the role of the DLM function of the management device is to ensure that the ADSL connections provide a good compromise between the stability of the line and the performance of the line in terms of bit rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to increase or decrease the noise margins (i.e. the SNR margins) and/or interleave levels as required by setting a new profile for each ADSL connection (using the existing provisioning systems for setting profiles at DSLAM's). This basic functionality is enhanced with logic to minimise churn or oscillation of profiles (by attempting to stabilise the DSLAM profile for each connection, rather than reacting to every relevant change in the environment of the connection which could cause the maximum stable profile applicable to change).

Main Embodiment

Figure 1:
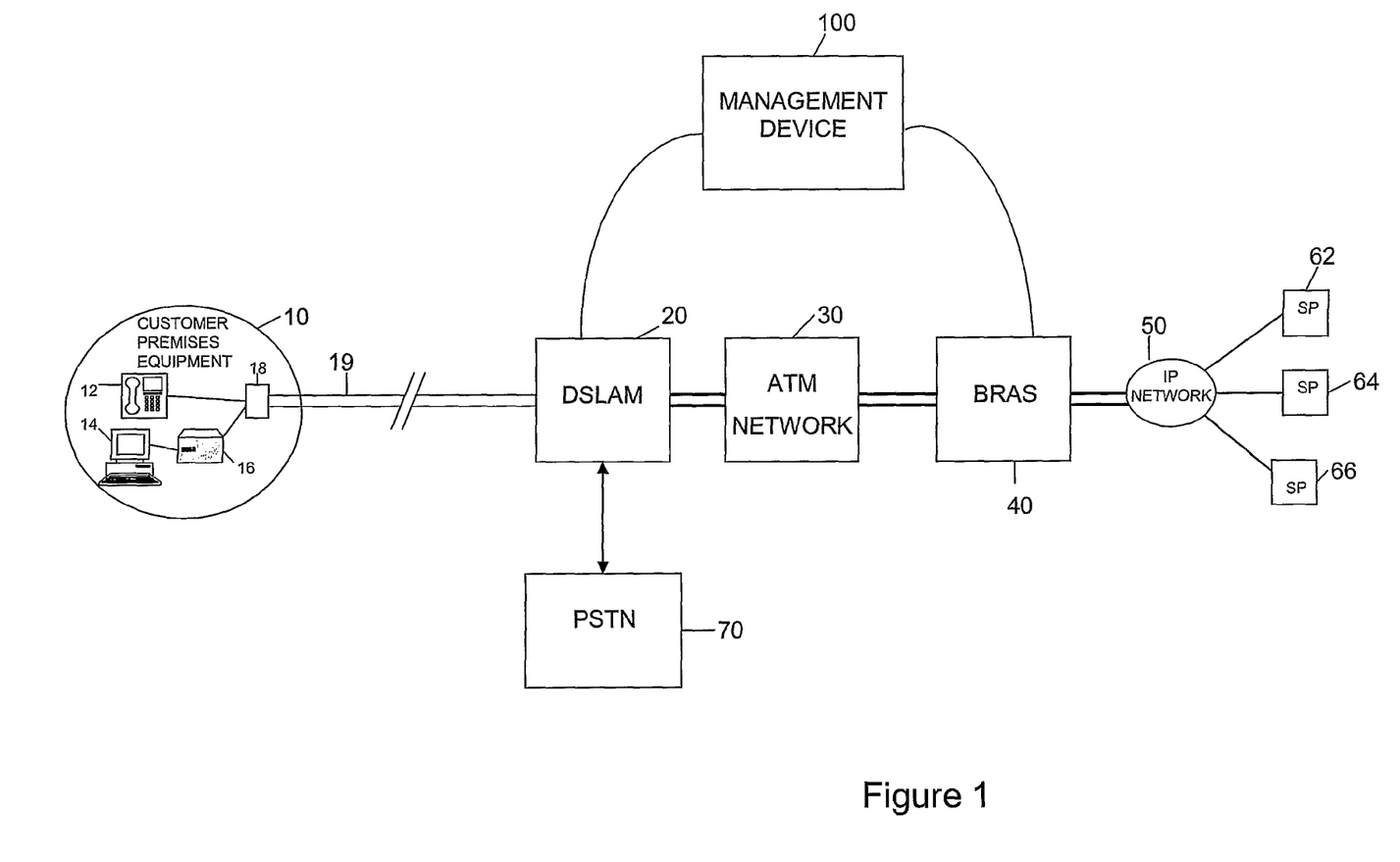
FIG. 1 is a schematic block diagram illustrating a telecommunications network incorporating a management device operating in accordance with a method according to the present invention.

Referring to FIG. 1, a first embodiment of the present invention is illustrated in overview. A copper pair loop 19 (which forms part of the access network which extends between customer premises equipment 10 and the BRAS 40) connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet travelling from computer 14 towards an ISP 62, 64, 66 would be the BRAS 40; whereas in other cases the first hop from an IP perspective could be beyond the BRAS 40.

In all cases, the end user's modem 16 creates a Point-to-Point Protocol (PPP) session from the modem to another device in the network. This is a logical end to end connection that carries the end users traffic from the modem to the target IP network.

In some cases (e.g. in BT's Central+ product), the PPP session is terminated on the BRAS, and then onward routed directly onto the Internet (e.g. via a core IP network such as BT's Colossus network).

In one example configuration where the PPP session is not terminated at the BRAS 40, the PPP session is terminated on a "home gateway" at the edge of the core network, connected to the Service Provider (SP). In another example configuration (e.g. such as in the BT central product) a Layer 2 Tunneling Protocol (L2TP) tunnel is used to pass through the BRAS 40 to a terminating BRAS which belongs to the SP; the L2TP tunnel tunnels all the PPP sessions into the SP network for them to handle as they want.

In all cases, the first IP hop is from the end user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IF layer (where the BRAS 40 terminates a PPP connection from the customer premises equipment 10) or at a lower level (e.g. at the ATM layer) where there is some sort of sub-IP layer tunneling through the BRAS 40.

The above mentioned arrangement of items 10, 19, 20, 30, 40, 50, 62, 64, 66 and 70 is conventional. However, in addition to this conventional arrangement, in the present embodiment there is a management device 100 which communicates with both the DSLAM 20 and the BRAS 40. The detailed operation of this device (especially as regards its DLM function) is explained in greater detail below with reference to FIGS. 2 and 3. However, in overview it obtains information from the DSLAM 20 about the rate at which each Digital Subscriber Line (DSL) connects to the DSLAM and information about events such as detected errors and/or resyncs occurring on the line/connection and modifies the operation of the DSLAM's as regards the aggressiveness of the profile used by a respective DSLAM for a respective DSL connection.

Figure 2:
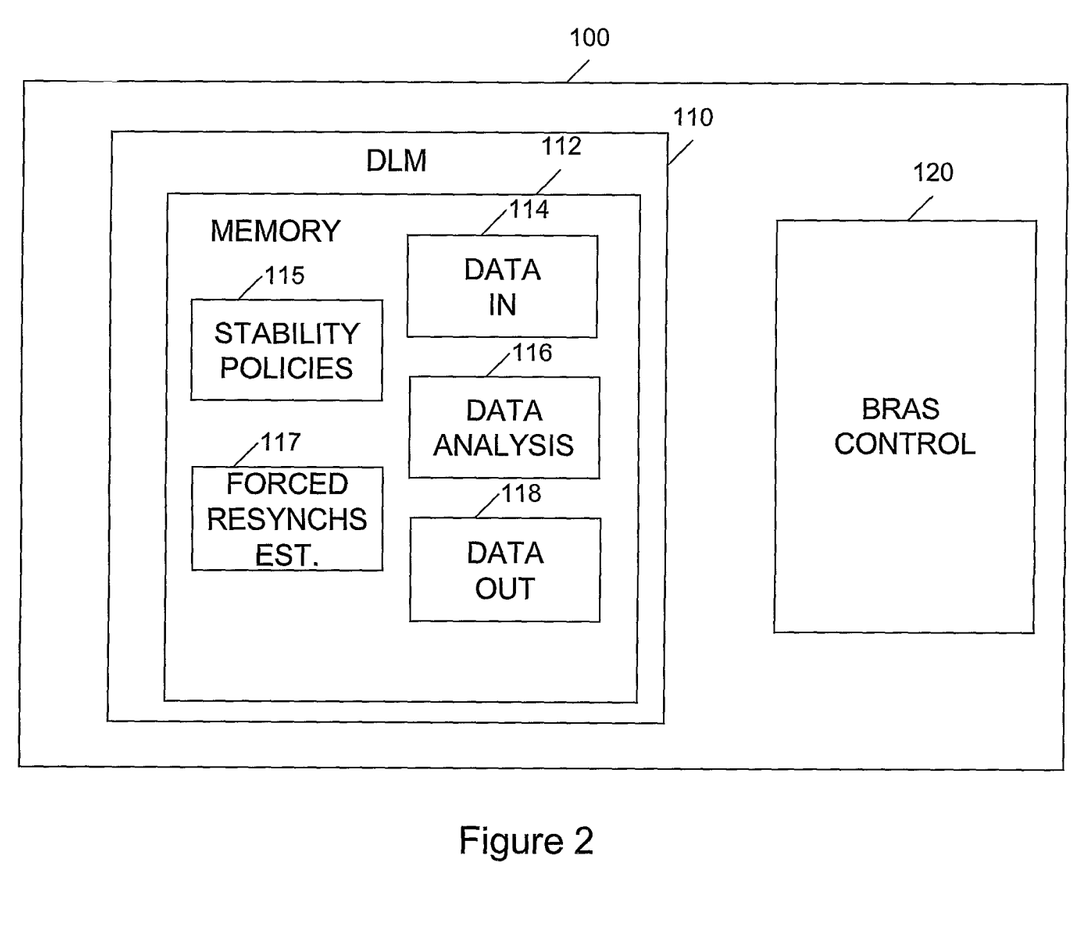
FIG. 2 is a schematic block diagram illustrating the management device of FIG. 1 in more detail.

As shown in FIG. 2, the management device 100 comprises two main functional parts, a BRAS provisioning or BRAS control function 120 and a Dynamic Line Management (DLM) function 110.

The BRAS provisioning function 120 processes part of the information received from the DSLAM's to assess a consistent connection speed achieved by each DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with. Precise details of some of the algorithms which may be used by the BRAS Control function 120 of the management device 100 to calculate a consistent rate in the present embodiment are described in copending International applications GB2006/002826 and GB2006/002818. However, it should be noted that the intention of these algorithms are to arrange that the user will receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM.

Details of the particular algorithm employed in the present embodiment by the DLM function are set out below. In overview however, a DLM data receiving sub-function receives a new file daily from each element manager containing up to 96 timeslots (15 minute period) per DSL connection per day together with information about a stability policy or level associated with each connection. This data is used in a DLM analysis sub-function to determine if changes to the DSLAM profile are required to stabilise the end users service to comply with the connection's respective associated stability policy or level. If changes are required, a DLM output sub-function sends a request to the Operational Support System (OSS) of the access network for the profile applied to the line to be changed. The precise way in which this is performed will depend on the details of the OSS of the particular access network and is not relevant to the present invention and so will not be described further herein.

Each of the DLM sub-functions mentioned above is implemented by standard computer processor components operating in accordance with software code modules stored in a memory 112 forming part of the DLM function 110; in particular, a DLM data receiving code module 114 (DATA IN) causes implementation of the DLM data receiving sub-function, a DLM analysis code module 116 (DATA ANALYSIS) causes implementation of the DLM analysis sub-function and a DLM output code module 118 (DATA OUT) causes implementation of the DLM output sub-function. Additionally, the memory 112 also stores the stability policy data set 115 (STABILITY POLICIES) in which the stability level or policy associated with each DSL connection managed by the management device is held. Furthermore, in the present embodiment, the memory 112 also stores a forced resynchronisation estimation module 117 (FORCED RESYNCHS EST.) for implementing a sub-function to estimate the number of resynchronisations for each line in each batch of data caused as a result of some sort of error, etc. occurring in the connection rather than as a result of user actions (e.g. to switch off or disconnect their DSL modem). This forced resynchronisation estimation sub-function is described in greater detail below.

The main source of input data for the DLM function is a daily file from each element manager, giving an aggregated report of each line's activity over the preceding 24 hours. This results in a change in DSLAM profile being applied no more frequently than once every 24 hours which is advantageous because it avoids the possibility of the DSLAM being reconfigured every time a line re-syncs. In addition however, the DLM function additionally receives input data specifying a stability level for each line. In the present embodiment, this is input from a database into which the data is manually entered by an operator as part of the process of provisioning a new DSL connection and is stored within the stability policies data set 115 within the DLM memory 112. Thus in the present embodiment, the intention is that when a customer orders a DSL connection he/she is offered different levels of stability (which will be most suitable for certain different types of activity); thus customers who mostly intend to use the connection for video streaming will benefit from a stable connection, whereas customers mostly using their connection for downloading large files, etc. would benefit from a higher bit-rate rather than from very high stability levels. Alternatively, instead of providing this facility on an end-user by end-user basis, retail customers (i.e. Service Providers) of the network service operator (i.e. a wholesale network, operator) could be provided with the option to select a stability level on behalf of their customers and could sell this on to their (end user) customers as a "specialised" product offering.

However, in alternative embodiments, the stability level could be updated more dynamically, as a result of a request by the user. In an example embodiment, a web server could be provided to receive user requests for a change of stability level (perhaps with a maximum permitted frequency of requests permitted per user, e.g. no more than one per hour or one per day, etc.) and this could then cause the DLM function as soon as possible to re-run it's comparison process for that line with the newly requested stability level and, if as a result of the comparison it is determined appropriate to transition to a new profile, then to transition to the new profile, again as soon as possible so that the user experiences a fairly dynamic response to a request to change the stability level.

Each time a line is checked to see if its profile should be changed (which in the present embodiment occurs once every 24 hours as part of a batch processing function), the corresponding stability level associated with that line is read and then threshold values for that line are set depending on the stability level associated with the respective line. The daily file data is then processed and the data for the respective line being analysed is compared with the threshold values set for that line in dependence upon the stability level associated with the line. If the comparison indicates that a transition should be made, then a corresponding instruction is issued to the OSS system for a corresponding transition to be made.

The DSLAM profile has two parameters which are adjusted in the various different profiles available for the DLM function to choose between in order to improve the stability of the line or conversely to improve the bit-rate or low-latency of the connection: the target margin and the run mode (the latter enabling the use of interleaving). The default line profile which is initially applied to all lines has a target margin of 6 db and interleaving disabled (often referred to as being in fast mode). Changing these parameters is based on two performance metrics in the present embodiment, errors (in particular, in this embodiment, errors caused by code-violations) and re-trains (i.e. re-syncs).

The number of errors and re-trains is normalised to up-time (total synchronised time during the period) to form the actual performance metrics used to determine the stability of the line. For example 100 errors in 10 hours of up-time after normalisation is (quite sensibly) very different from 100 errors in 1 minute of up-time. The normalisation is performed by calculating a mean-time-between either errors or re-synchs. Furthermore, in the present embodiment, the re-trains parameter is also processed, prior to use as a stability performance metric, by discounting the number of resynchs deemed to be user-caused resynchs, prior to calculating the mean-time-between resynchs. In the present embodiment, this is achieved using the following method, as specified below according to the following pseudo-code:

[Note the following assumes that an array uptimes[ ] has been formed and populated, such that each element in the array corresponds to one of the 96 15-minute bins per 24-hour period (in the present embodiment) for a particular DSL connection—the type of the array (i.e. 1 bit numbers, 1 byte integers, short integers, floating numbers, etc.) is unimportant so long as where an element of the array is zero it indicates zero uptime in the corresponding bin and a non-zero value indicates that there was at least some uptime in that bin—if 1-bit values are used they may be considered as taking either a True or a False value, in which case one of these should be used to indicate zero uptime instead of zero—however, in the present embodiment, each element comprises a short integer between 0 and 900 specifying the number of seconds of uptime in the respective 15-minute (i.e. 900-second) bin.]

*** Comment—method to count number of unforced re-trains in a 24-hour period for a given connection

```
SET unforcedretrains = 0
FOR (i = 0 to 95) (
    IF (uptimes[i] = 0 AND uptimes[i+1] != 0) THEN
    unforcedretrains++
)
RETURN unforcedretrains.
```

The above pseudo-code basically says to check each bin and determine if it has zero uptime whilst the subsequent bin has non-zero uptime (i.e. detecting a transition from a bin with no uptime to a bin with some uptime) and for each such transition to increment the variable unforced retrains which thus keeps a running total of the number of (assumed-to-be) user-caused re-synchs. This value is then subtracted from the total number of retrains detected for the respective connection within the 24 hour period to obtain an estimated number of forced retrains for the 24-hour period and then the total uptime in seconds is divided by the estimated number of forced retrains to obtain an estimated mean time between re-trains in seconds. In the present embodiment, the uptimes[ ] array stores the number of seconds of uptime in each bin so that it is easy to obtain the total uptime for the connection by simply summing the values of all of the elements in the array.

Having calculated the metrics to be used in assessing the stability of the line, a check is made against thresholds, etc. as described in greater detail below, and if it is deemed necessary or desirable a change in profile will be made.

In general, if a move to a less aggressive profile is deemed necessary, a move over to an interleaved profile is made in preference to an increase in the target margin. Initially an interleaved profile is set with the same corresponding target margin as the previous fast mode profile (i.e. 6 dB fast would transition to 6 dB interleaved).

If a customer has opted-out of the option to apply interleaving (e.g. because low latency is more important to them than maximum bit-rate—such as is often the case for customers who are on-line garners or VoIP or video conference users) then transitions are only made between fast mode profiles (only the target margin is varied). This clearly limits the capability of the DLM process.

Before a transition is made, a check is made against line rate to ensure that a line is capable of making the transition to a new profile without suffering a bit rate drop so drastic that it would fall below a predetermined minimum acceptable bit rate. A transition is only made if there is some confidence that the line will be capable of supporting service above this minimum acceptable rate once the new profile is applied. For example, in the present embodiment a transition to a higher noise margin profile is only made if the current bit rate is approximately 800 kbps greater than a Fault Threshold Rate (FTR) (the FTR represents the minimum acceptable bit rate as determined by the network operator—in the present embodiment, the network operator is a wholesaler of network services and supplies these services to network retailers, or Service Providers, who in turn supply consumers; the Maximum Stable Rate is a parameter which is determined by the wholesaler network operator and provided to the service provider as an indication of the estimated capability of the line, the FTR is related to the MSR but is set below this and is used to trigger a fault report if the connection rate ever falls below the FTR since this is an indication that the line is performing significantly below the rate that it is believed to be capable of operating at). If the line is unstable and yet cannot make the transition because it would drop below its minimum acceptable bit rate (i.e. the FTR), then this is flagged for further investigation. In the present embodiment, the FTR is initially set at 2 Mbs and is then re-set to 80% of the Maximum Stable Rate detected by the network during the first 10 days of operation of the DSL in its rate adaptive mode.

If a line fails to synchronise then a transition will be made to a lower target margin. If this means returning to a previously unstable state then this is flagged for further investigation as the line is not effectively stabilised (even though it isn't at the maximum target margin). The line is returned to the previous unstable state so that some level of service can be provided to the customer whilst an investigation takes place.

If a line fails to synchronise even at the lowest target margin then it is flagged for investigation. For example, it may not be able to support the required service or the line may be faulty.

Similarly, if a line is still unstable at the maximum possible target margin then it is flagged for further investigation. For example the line may be faulty.

If a line is completely stable then in general the DLM function moves the line to a lower target margin (or interleave depth) to increase the available capacity (or reduce the latency) on the line (remember 3 dB≈800 kbps). However, these transitions are handled carefully to avoid frequent changes in target margin (or interleave depth) up and down. Thus if a line has previously been moved from a more aggressive lower target margin (or less interleaved) profile to the current target margin (and interleave depth), it must wait a considerably longer time (e.g. a week; or a month) before being re-transitioned back to the lower target margin (or interleave depth) profile than if it has not previously been moved back from the lower target margin (or interleave depth) profile.

In the present embodiment, there is a manual process to enable the transition between any line profile (e.g. 3 dB fast straight to 15 dB interleaved is possible by manual intervention).

In the present embodiment, those lines, which have been flagged for further investigation are pro-actively repaired in the hope that they can be repaired before any fault report is generated.

Re-profiling requests to move to a less aggressive profile can occur on a daily basis. Re-profiling decisions on stable lines to move to a more aggressive profile to increase overall capacity are made over a longer time period (which generally increases with the number of times that the line has previously been moved off the target profile because of lack of stability issues) as discussed in the preceding paragraph.

In the present embodiment, each line is categorised by the first sub-function of the DLM function into one of four different categories in dependence upon the normalised number of errors and/or re-syncs as reported to the DLM function in the bulk file. The categories correspond to very poor, poor, acceptable and very stable.

The basic flow of the DLM process is shown in Table 1 below.

TABLE 1

In the present embodiment, the general progression through the profiles shown in Table 1 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorised as very poor is immediately moved two steps in the better stability direction (e.g. from 6 dB Fast profile it would move to 9 dB Interleaved, from 6 dB Interleaved it would move to 12 dB Interleaved, etc.). A line categorised as poor is immediately (although with lower priority than the re-profiling of any very poor categorised lines) moved one step in the better stability direction (e.g. from 6 dB Fast to 6 dB Interleaved or from 9 dB interleaved to 12 dB Interleaved). A line categorised as acceptable is maintained on its current profile (i.e. no action is taken). A line categorised as very stable is moved (if the further requirements to avoid oscillations etc. are also satisfied) one step in the higher capacity direction (e.g. from 6 dB Fast to 3 dB Fast, from 9 dB Interleaved to 6 dB Interleaved or from 3 dB Interleaved to 3 dB Fast).

in the present embodiment, each line is processed once every 24 hours to determine how the line should be categorised, and thus if a new profile should be selected for that line. In order to avoid frequent oscillations between adjacent profiles, a good and a bad delay counter are used to place a delay on how quickly a line is reprofiled. Thus, every time a line is categorised as good a good delay counter is incremented (and a poor delay counter is decremented) and only once the good delay counter has reached a good threshold (which in the present embodiment is set to 13) is a request made to the OSS for the profile to be increased by one step to a more aggressive level, and then the delay counters are reset. Furthermore, every time a line is categorised as poor, a poor delay counter is incremented (and the good delay counter is decremented) and only once the poor delay counter reaches a poor threshold (which in the present embodiment is set to 3) is its profile dropped by one step to a less aggressive level. The delay counters are never decremented below 0 such that even if a line has experienced a number of good days (such that the poor delay counter has been decremented to zero, e.g. five good days in a row) only 3 days in a row of the line behaving poorly are required for the poor threshold to be reached causing a re-profiling. Furthermore, a delay doubler is used to increase the delay (i.e. by increasing the good threshold) required before a line which has moved down from a more aggressive profile to a less aggressive profile level is allowed to re-transition back up to the more aggressive level. The delay doubler is therefore incremented (in the present embodiment up to a maximum of 5) whenever the line is re-profiled to a less aggressive level and then the delays are reset (as in the case where the line is re-profiled to a more aggressive level). Resetting the delays is done according to the following formulas:

GOOD THRESHOLD=DEFAULT GOOD THRESHOLD*2EXP(DELAY DOUBLER)

POOR DELAY COUNTER=GOOD DELAY COUNTER=0

The DEFAULT GOOD THRESHOLD is set in the present embodiment to 13 (i.e. equivalent to 14 days), the DEFAULT POOR DELAY is set in the present embodiment to 3 (i.e. equivalent to 3 days) and the DELAY DOUBLER is set to 0, thus the initial good delay is 13 but each time the line's profile is transitioned to a less aggressive profile the DELAY DOUBLER is incremented until after 5 such transitions, each time the DELAY is reset it is reset to a value of 448 (i.e. equivalent to approx 14 months). In the present embodiment, if a user's stability policy or level is changed the delay doubler is reset back to zero; furthermore, the delay doubler and even the delay counter may be manually reset by an operator to cater for exceptional circumstances.

Figure 3:
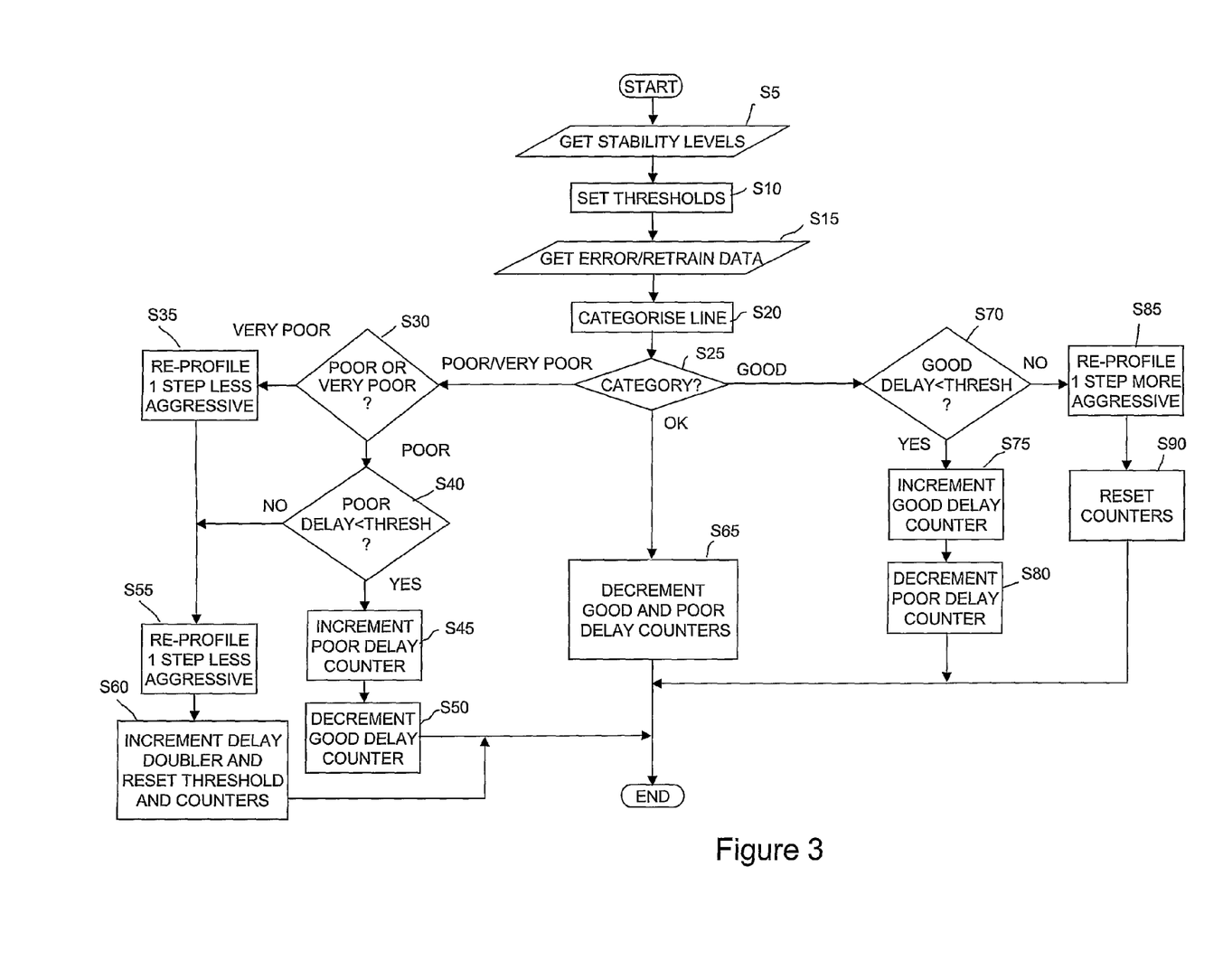
FIG. 3 is a flow diagram illustrating the steps carried out by the management device of FIG. 1 in order to control the DLM profile applied to the DSL connections in the network of FIG. 1.

In the present embodiment, the specific functionality of the DLM function to permit different lines to operate at different levels of stability according to stability policies set for each line, is now described below with reference to FIG. 3. In brief, in the present embodiment, before the DLM performs its line categorisation function for a particular line, it's associated stability level is determined and then the categorisation is based on the threshold values associated with the respective stability level, each stability level having a different set of associated threshold values for use in the categorisation function. Thus, at step S5 the stability level for the particular line to be categorised is obtained together with the delay data stored for that line (i.e. the current value for the delay counter, DELAY, which, as mentioned above, is initially set to a value of 3 and the current value of the delay doubler, DELAY DOUBLER, which is initially set to a value of 0).

The process then moves to step S10 in which the threshold values associated with the stability level looked up in step S5 are obtained for use in the remainder of the process and then the process proceeds to step S15.

At step S15 the DLM function obtains the current error and re-synch data which it has received in respect of the present line being analysed. This is read from the daily data file which is sent to the DLM function on a daily basis as described above. The process then proceeds to step S20.

Step S20 is the step responsible for actually categorising lines into one of four possible different categories: very poor, poor, OK and good. To do this both of the metrics used in the present embodiment, namely no. of errors detected (at both the user modem and the network modem in the DSLAM) and the number of re-synchs (as recorded by the DSLAM) are compared (after normalisation as mentioned above) with various corresponding thresholds whose values are set according to the stability level to which the line is assigned. Table 2 below sets out the various thresholds used in the present embodiment.

TABLE 2

| Stability | Metric | Very Poor | Poor | OK | Good |
| --- | --- | --- | --- | --- | --- |
| Aggressive | Re-Trains | >10 per hour | mtb < 3600 | mtb < 8640 | mtb ≧ 8640 |
| Aggressive | Errors | — | mtb < 10 | mtb < 8640 | mtb ≧ 8640 |
| Normal | Re-Trains | >10 per hour | mtb < 7200 | mtb < 8640 | mtb ≧ 8640 |
| Normal | Errors | — | mtb < 300 | mtb < 8640 | mtb ≧ 8640 |
| Stable | Re-Trains | >10 per hour | mtb < 28800 | mtb < 86400 | mtb ≧ 86400 |
| Stable | Errors | — | mtb < 1000 | mtb < 28800 | mtb ≧ 28800 |

In table 2 "mtb" stands for "mean time between" and thus corresponds to the normalised metrics calculated by dividing the total time in seconds for which the respective line has been in synchronisation over the past 24 hour period of the monitoring by the number of re-trains or errors recorded in that period. For all cases, in the present embodiment, if there are more than 10 re-trains in any one hour period, the line is assumed to be very poor, regardless of the number of errors recorded. For lines operating at an aggressive stability level, if the average time between retrains is less than once per hour (=3600 seconds) (e.g. 6 re-trains in less than 5 hours of "up-time") or if the average time between errors is less than one per 10 seconds of up-time, then the line is deemed to be poor; if the average time between re-trains is less than once every 2.4 hours (but more than once every hour) or the average time between errors is less than once every 2.4 hours (but more than once every 10 seconds) then the line is deemed to be ok, whereas if the average time between re-trains is greater than or equal to once every 2.4 hours or if the average time between errors is greater than or equal to once every 2.4 hours, then the line is deemed to be good. From Table 2 above, it is clear what the thresholds are for the other stability levels in the same way.

In an alternative embodiment, the stability levels could operate such that for the most aggressive stability level the DLM function attempts to keep sync loses to below 12 per 24 hour period (including switching off modems/routers which count as a sync loss) and to keep the line error free for 98.3% ($^{59}/_{60}$ seconds) of uptime measured over a 24 hour period; for the normal stability level the DLM function attempts to keep sync loses to below 6 per 24 hour period and to keep the line error free for 99.8% ($^{599}/_{600}$ seconds) of uptime measured over a 24 hour period; and for the stable stability level the DLM function attempts to keep sync loses to below 3 per 24 hour period and to keep the line error free more than 99.98% ($^{5999}/_{6000}$ seconds) of uptime measured over a 24 hour period.

Having categorised the line according to Table 2 in step S20 the process proceeds to step S25 where it is determined if the line has been categorised as being "poor/very poor, OK, or good". If the line is categorised as being poor/very poor, the process proceeds to step S30 in which it is determined if the line has been categorised as very poor or poor. If at step S30 it is determined that the line has been categorised as very poor then the process proceeds to step S35 in which an OSS request is issued for the line DLM profile to be transitioned 2 steps in the less aggressive direction, provided it is at least two steps above the minimally aggressive level (which, in the present embodiment is 15 dB, Interleaved as is clear form Table 1), otherwise it just transitions straight to this minimally aggressive level; if the line is already at this minimally aggressive level, it remains there but a fault is flagged to the system for attention by an engineer. Upon completion of step S35, the method proceeds to step S60.

If at step S30 it is determined that the line has been categorised as poor, the process proceeds to step S40 in which it is determined if the poor delay counter is less than the poor threshold. If so, the method proceeds to step S45 in which the poor delay counter is incremented (by one) and then the method proceeds to step S50 in which the good delay counter is decremented (by one). Upon completion of step S50, the process ends (for the respective line). If at step S40 it is determined, on the other hand, that the delay counter equals (or exceeds) the poor threshold, then the method proceeds to step S55 in which an OSS request is issued for the line DLM profile to be transitioned 1 step in the less aggressive direction, provided it is not already at the minimally aggressive level (which, in the present embodiment is 15 dB, Interleaved, as is clear form Table 1), otherwise it remains there (i.e. at the minimally aggressive level) but a fault is flagged to the system for attention by an engineer. Upon completion of step S55, the method proceeds to step S60.

At step S60, which is arrived at either after performing a two step less aggressive reprofiling in step S35 or after performing a one step reprofiling in step S55, the delay doubler is incremented by one (provided it has not already reached its maximum value of 5 in which case it just stays at 5) and then the good threshold is reset according to the formula GOOD THRESHOLD=DEFAULT GOOD THRESHOLD*2EXP (DELAY DOUBLER). Finally in step S60, the poor and good delay counters are both reset to zero. Upon completion of step S60, the method ends (for the respective line being processed) and the DLM function moves on to analysing any further lines requiring analysis in the current 24 hour period batch process.

If at step S25 it is determined that the line is categorised as OK, then the process proceeds to step S65 in which the good and bad delay counters are both decremented by one (although if a counter is already at zero it is not decremented further but rather stays at zero). This decrementing of the delay counters for lines which are categorised as OK ensures that lines which are only occasionally good or only occasionally bad but mostly are OK, will remain on there current profile setting. Upon completion of step S65, the process (for the respective line being processed) ends.

If at step S25 it is determined that the line is "good", the method proceeds to step S70 in which it is determined if the good delay counter is less than the good threshold. If so, the process proceeds to step S75 in which the good delay counter for the line in question, (GOOD DELAY), is incremented (by one). Upon completion of step S75; the process proceeds to step S80 in which the poor delay counter (POOR DELAY) is decremented; this helps to prevent lines which are typically good as often as they are poor from being moved to a different profile. Upon completion of step S80, the process (for the respective line being processed) ends.

If at step S70 it is determined that the good delay counter (GOOD DELAY) is not less than the good threshold (GOOD THRESHOLD)—i.e. it has reached or exceeded the threshold—then the process proceeds to step S85 in which an OSS request is made to transition the DLM profile of the line one step in the more aggressive direction (provided it is not already at the most aggressive profile, which, in the present embodiment is 3 dB non-interleaved mode, as is clear from Table 1, in which case it simply stays at this most aggressive profile). Upon completion of step S85, the method proceeds to step S90 in which the delay counters, GOOD DELAY and POOR DELAY, for the line is reset and then the process (for the respective line) ends. As mentioned above, once the process ends for the current line being processed, the DLM function moves on to analysing any further lines requiring analysis in the current 24 hour period batch process.

Variations

As a slight variant on the above described process, an AGGRESSIVE PROFILE flag can be used to track when a reprofiling has been made in the more aggressive direction, and the delay doubler may be incremented only if a reprofiling has occurred in the less aggressive direction (immediately) after a reprofiling has been made in the more aggressive direction. This helps to increase the delay before which a more aggressive transition can be made only if there is evidence of oscillation between different profiles. This functionality may be implemented by including an additional step after (i.e. upon completion of) step S90 to set the AGGRESSIVE PROFILE flag to true (from a default setting of false); and by amending step S60 such that the delay doubler is only incremented if the AGGRESSIVE PROFILE flag is set to true, and then resetting the AGGRESSIVE PROFILE flag back to false after incrementing the delay doubler.

In alternative embodiments, different methods could be used to distinguish user-caused re-trains and forced re-trains. For example, some special software could be installed on the user modem end (i.e. either to run on the user's p.c. connected to the end-user DSL modem, or to run on the DSL modem itself) to detect whenever the modem is seemingly disconnected by the user (e.g. by detecting that power to the modem has been lost—e.g. because the user has switched off the modem or disconnected the power cable, etc; or by detecting that a telephone cable has been unplugged, etc.). Moreover, the various ADSL standards even specify as an optional requirement that the ATU's (i.e. the ADSL modems) should monitor for a loss of power and report this if requested. Unfortunately, this feature has not been widely implemented yet by manufacturers of ADSL modems. For this reason, the approach described in the preferred embodiment above of looking for transitions betweens periods in which no connection is detected as being present and periods in which a connection is detected as being present is preferred because it can be done with common existing modems without any modifications to the modems or the users' pc's (or the software running thereon).

The invention claimed is:

1. A method of operating an access network including a plurality of data connections between end user devices and an aggregation transceiver device where the plurality of data connections are aggregated for onward connection through the access network, the method comprising:
storing a plurality of different profiles, each of which specifies a set of values for a plurality of parameters associated with a data connection; and, for each data connection,
monitoring the performance of the respective data connection;
selecting one of said stored profiles to be applied to the respective data connection in dependence on the results of monitoring the performance of the respective data connection; and
applying the selected profile to the respective data connection; wherein
monitoring the performance of the respective data connection includes determining or estimating the number of times that the respective data connection resynchronises, within a given period of time, as a result of an automatic or forced resynchronisation rather than as a result of user action and using the determined or estimated number of forced resynchronisations, discounting an estimated number of resynchronisations resulting from user action, when selecting the profile to apply to the respective data connection, wherein
estimating the number of resynchronisations resulting from user action comprises detecting that more than a predetermined minimum period of time has elapsed prior to or after a resynchronization without the respective data connection having been established and without the end user device connected to a line associated with the respective data connection automatically attempting, but failing, to re-establish the respective connection.

2. A method according to claim 1 wherein determining or estimating the number of forced resynchronisations comprises determining the total number of resynchronisations for all reasons, and subtracting the estimated number of resynchronisations resulting from user action to obtain an estimate for the number of forced resynchronisations.

3. A method according to claim 1 wherein detecting that more than a predetermined minimum period of time has elapsed prior to or after a resynchronization without the respective data connection having been established and without the end user device automatically attempting, but failing, to re-establish the respective data connection comprises counting the contiguous periods of downtime exceeding the predetermined minimum period of time within the given period of time.

4. A method according to claim 1 further comprising:
storing, in respect of each data connection, a stability level, specifying a desired level of stability for the data connection; and,
for each data connection, selecting one of the stored profiles to be applied to the respective data connection in dependence on both the results of monitoring the performance of the respective data connection and the stability level associated with the respective data connection.

5. A method according to claim 4 wherein
a Dynamic Line Management (DLM) profile and the stability level are both stored within a device controlled by the operator of the access network.

6. A method according to claim 4 wherein
the stability level is stored within an end user device and messages to the aggregation transceiver device are sent whose value depends upon the stored stability level.

7. A method according to claim 1 wherein
the plurality of data connections are digital subscriber lines including remote and central transceiver units connected over a copper pair and operating in accordance with one or more of the various xDSL standards agreed by the International Telecommunication Union.

8. A method according to claim 1 wherein
the aggregation transceiver device is a Digital Subscriber Line Access Multiplexer comprising a plurality of central transceiver units operating in accordance with an xDSL standard.

9. A management device for use in an access network including a plurality of data connections between end user devices and an aggregation transceiver device where the plurality of data connections are aggregated for onward connection through the access network,
the access network storing in association with each data connection a Dynamic Line Management (DLM) profile which specifies a set of values for a plurality of parameters associated with the respective data connection, the management device comprising:
a receiver arranged to monitor data specifying the stability of each respective data connection over a given period of time;
a processor unit arranged to select a DLM profile to be applied to the respective data connection in dependence on the monitoring data; and
a requester unit arranged to request an OSS system of the access network to apply the selected DLM profile to the respective data connection;
the processor unit being further arranged to determine or estimate the number of times that the respective data connection resynchronises, within the given period of time, as a result of an automatic or forced resynchronisation rather than as a result of user action and using the determined or estimated number of forced resynchronisations, discounting an estimated number of resynchronisations resulting from user action, when selecting the DLM profile to apply to the respective data connection, wherein
the estimated number of resynchronisations resulting from user action is based on detecting that more than a predetermined minimum period of time has elapsed prior to or after a resynchronization without the respective data connection having been established and without the end user device connected to a line associated with the respective data connection automatically attempting, but failing, to re-establish the respective data connection.

10. An access network including a plurality of data connections between end user devices and an aggregation transceiver device, and a management device according to claim 9.

11. A non-transitory computer-readable storage medium storing a computer program to be executed by a computer to instruct the computer to perform the method of claim 1.

* * * * *